United States Patent
Tomoi

(10) Patent No.: US 12,091,082 B2
(45) Date of Patent: Sep. 17, 2024

(54) LANE KEEPING CONTROL APPARATUS FOR VEHICLE

(71) Applicant: SUBARU CORPORATION, Tokyo (JP)

(72) Inventor: Sho Tomoi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 349 days.

(21) Appl. No.: 17/141,374

(22) Filed: Jan. 5, 2021

(65) Prior Publication Data

US 2021/0253166 A1 Aug. 19, 2021

(30) Foreign Application Priority Data

Feb. 17, 2020 (JP) .................................. 2020-024427

(51) Int. Cl.
*B62D 15/02* (2006.01)
*B62D 5/04* (2006.01)

(52) U.S. Cl.
CPC ......... *B62D 15/025* (2013.01); *B62D 5/0463* (2013.01); *B62D 15/021* (2013.01)

(58) Field of Classification Search
CPC ... B62D 15/025; B62D 5/0463; B62D 15/021
See application file for complete search history.

(56) References Cited

U.S. PATENT DOCUMENTS

| | | | |
|---|---|---|---|
| 2008/0306655 A1 | 12/2008 | Ukai et al. | |
| 2010/0138112 A1* | 6/2010 | Suzuki et al. | G06F 19/00 701/42 |
| 2015/0307125 A1* | 10/2015 | Kunihiro | B62D 6/003 701/42 |
| 2016/0057921 A1* | 3/2016 | Pickett | A01B 69/008 701/41 |
| 2017/0331403 A1* | 11/2017 | Irie | H02P 27/06 |

(Continued)

FOREIGN PATENT DOCUMENTS

| | | | |
|---|---|---|---|
| JP | 5-338548 A | | 12/1993 |
| JP | H11214783 A | * | 8/1999 |

(Continued)

OTHER PUBLICATIONS

Notice of Reasons for Refusal issued in Japanese Patent Application No. 2020-024427 dated Aug. 1, 2023, with machine translation.

*Primary Examiner* — Marc Burgess
*Assistant Examiner* — Blaze A Belobrajdic
(74) *Attorney, Agent, or Firm* — TROUTMAN PEPPER HAMILTON SANDERS LLP

(57) ABSTRACT

A lane keeping control apparatus for a vehicle includes a controller. The controller is configured to set a target path on which the vehicle is to travel, calculate a control amount for an electric power steering motor, on a basis of at least an amount of deviation from the target path, control the vehicle such that the vehicle travels on the target path. The controller is configured to compare a response speed of an actual steering angle of the vehicle relative to a target steering angle for travelling on the target path and a set response speed, determine a gain of a current value for driving the electric power steering motor such that the response speed is equal to the set response speed, and update the determined gain.

3 Claims, 11 Drawing Sheets

(56) References Cited

U.S. PATENT DOCUMENTS

2018/0043935 A1\* 2/2018 Hashimoto et al. ... B62D 15/02
2018/0304918 A1   10/2018 Kunihiro et al.

FOREIGN PATENT DOCUMENTS

| JP | 2008-302900 A | | 12/2008 | |
| JP | 2011-37394 A | | 2/2011 | |
| JP | 2013212839 A | * | 10/2013 | .......... B60T 8/17557 |
| JP | 2017124667 A | * | 7/2017 | |
| JP | 2018-177120 A | | 11/2018 | |
| WO | 2013/132807 A1 | | 9/2013 | |

\* cited by examiner

LANE KEEPING CONTROL APPARATUS FOR VEHICLE

CROSS-REFERENCE TO RELATED APPLICATIONS

The present application claims priority from Japanese Patent Application No. 2020-024427 filed on Feb. 17, 2020, the entire contents of which are hereby incorporated by reference.

BACKGROUND

The disclosure relates to a lane keeping control apparatus for a vehicle that travels on a set target path by controlling electric power steering.

A lane keeping control technique for a vehicle has been known as drive assistance, for example, for recognizing a lane line of a road by using a camera or obtaining information such as information of a GPS to keep the traveling vehicle in the center of a lane by controlling steering of the vehicle, and for inhibiting lane deviation.

A lane keeping control apparatus for such a vehicle plans a travel path during steering intervention, implements feedforward control such that the travel path is traced, and corrects a difference between the actual travel path for the vehicle and the target path by feedback control.

For example, Japanese Unexamined Patent Application Publication No. 5-338548 discloses a technique for changing a gain by using a derivative value of a target steering angle for precise traveling even when there is a difference in the magnitude of road friction.

Japanese Unexamined Patent Application Publication No. 2008-302900 discloses a technique for correcting a steering force by using a torque output value to fit feeling about power steering into that at the time of shipment.

SUMMARY

An aspect of the disclosure provides a lane keeping control apparatus for a vehicle. The apparatus includes a controller. The controller is configured to set a target path on which the vehicle is to travel, calculate a control amount for an electric power steering motor, on a basis of at least an amount of deviation from the target path, and control the vehicle such that the vehicle travels on the target path. The controller is configured to compare a response speed of an actual steering angle of the vehicle relative to a target steering angle for travelling on the target path and a set response speed, determine a gain of a current value for driving the electric power steering motor such that the response speed is equal to the set response speed, and update the determined gain.

An aspect of the disclosure provides a lane keeping control apparatus for a vehicle. The apparatus includes circuitry. The circuitry is configured to set a target path on which the vehicle is to travel, calculate a control amount for an electric power steering motor, on a basis of at least an amount of deviation from the target path, and control the vehicle such that the vehicle travels on the target path. The circuitry is configured to compare a response speed of an actual steering angle of the vehicle relative to a target steering angle for travelling on the target path and a set response speed, determine a gain of a current value for driving the electric power steering motor such that the response speed is equal to the set response speed, and update the determined gain.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

A steering mechanism of a vehicle includes a rack shaft support mechanism that urges a rack shaft against a pinion shaft by using, for example, a spring and applies a predetermined frictional load in order to eliminate wobbling of a rack and pinion gear in a rack and pinion steering gearbox.

The frictional load that is applied by the rack shaft support mechanism decreases due to degradation over time caused by, for example, the friction of the rack and pinion gear. When the frictional load of the rack shaft relative to the pinion shaft decreases, steering responsiveness during lane keeping improves.

For this reason, the response of steering becomes sensitive with time, an actual steering angle changes from a steering angle that is instructed under lane keeping control, and there is a problem in that hunting (oscillation of a vehicle trajectory) occurs. Consequently, the vehicle travels so as to meander, and there is a problem in that the vehicle cannot stably travel.

In view of the above circumstances, it is desirable to provide a lane keeping control apparatus for a vehicle that inhibits hunting: a meander due to sensitive response of steering that occurs with time and that enables stable travelling as in that at the time of shipment.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
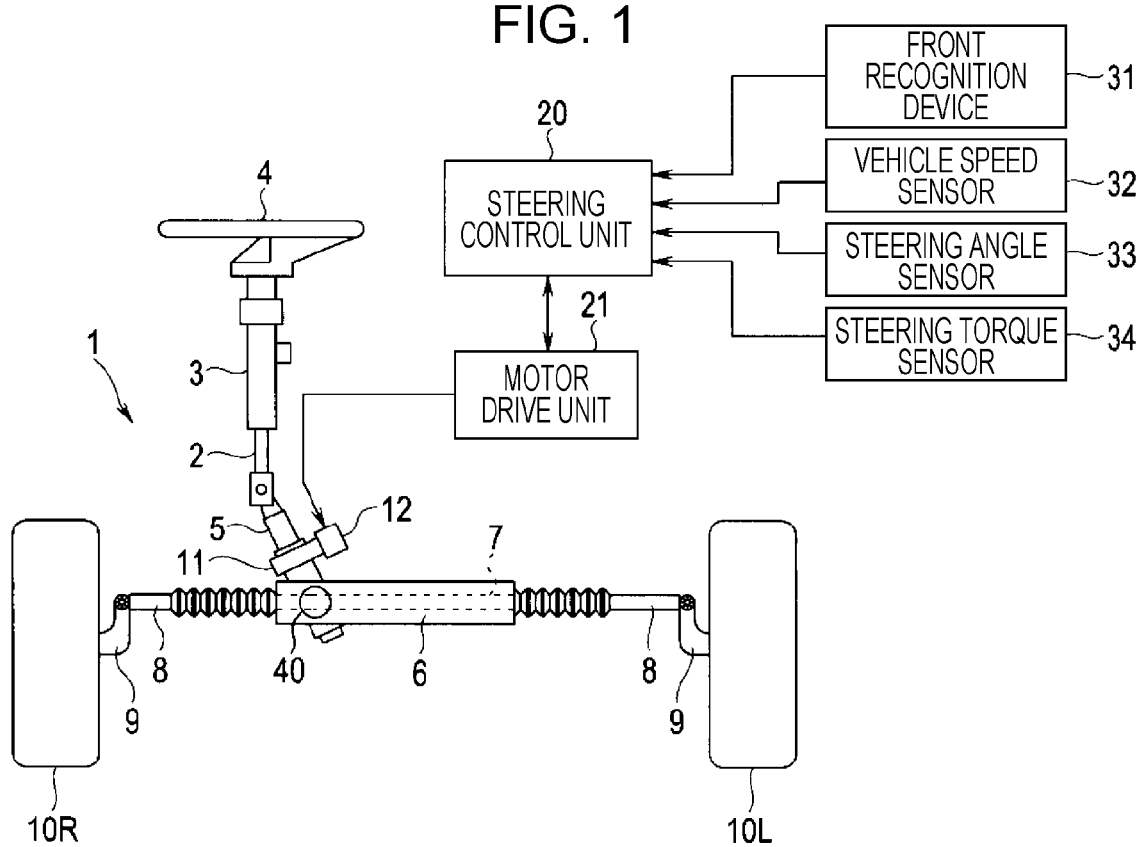
FIG. 1 schematically illustrates the structure of a steering system of a vehicle.

As for an electric power steering device 1 that includes a lane keeping control apparatus for a vehicle illustrated in FIG. 1, a steering angle can be set in a different manner from the operation of a driver, a steering shaft 2 is rotatably supported by a vehicle frame, not illustrated, with a steering column 3 interposed therebetween, an end thereof extends toward a driver's seat, and the other end extends toward an engine room.

A steering wheel 4 is secured to the end of the steering shaft 2 that faces the driver's seat, and a steering angle sensor 33 is provided. A pinion shaft 5 is coupled to the end of the steering shaft 2 that faces the engine room.

A steering gearbox 6 that extends in the direction of the width of the vehicle and that includes a rack shaft support mechanism 40 is disposed in the engine room, and a rack shaft 7 extends through and is supported by the steering gearbox 6 so as to be capable of reciprocating.

Both of the right and left ends of the rack shaft 7 protrude from the ends of the steering gearbox 6, and front knuckles 9 are coupled to the ends thereof with tie rods 8 interposed therebetween. The front knuckles 9 support left and right wheels 10L and 10R that are wheels to be operated in a swingable manner and are supported by the vehicle frame so as to be steerable.

Accordingly, when the steering wheel 4 is operated, and the steering shaft 2 and the pinion shaft 5 are rotated, the rack shaft 7 moves in a left-right direction as a result of the rotation of the pinion shaft 5, the front knuckles 9 swing about kingpin axes (not illustrated) due to the movement, and the left and right wheels 10L and 10R are steered in the left-right direction.

Figure 2:
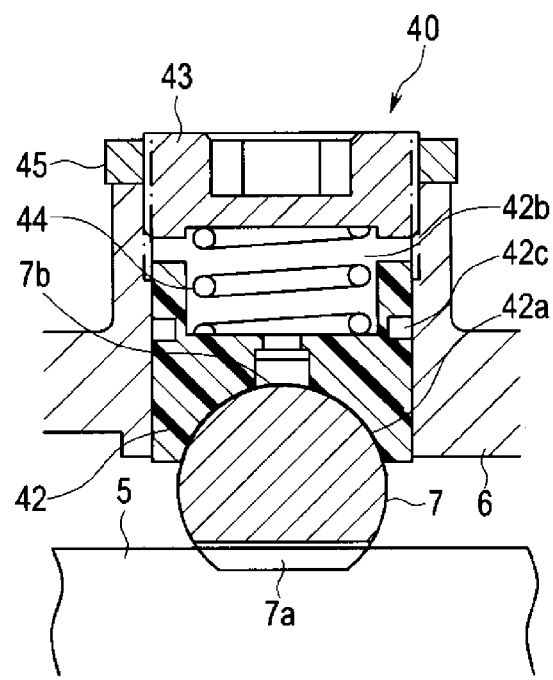
FIG. 2 is a sectional view of the structure of a rack shaft support mechanism.

The rack shaft support mechanism 40 is mounted on the steering gearbox 6. The rack shaft support mechanism 40 includes a rack shaft guide 42 (see FIG. 2).

The rack shaft guide 42 has a columnar shape and has a rack shaft sliding contact surface 42a that has a semicircular section along a portion that is in sliding contact with the rack shaft 7, and an axial back surface 7b opposite a rack 7a of the rack shaft 7 with its axis interposed therebetween is supported on the rack shaft sliding contact surface 42a so as to be capable of reciprocating and sliding in the axial direction.

A space between the rack shaft sliding contact surface 42a and the surface of the rack shaft 7 is filled with lubricant such as grease. A spring-containing recessed portion 42b is formed on a surface of the rack shaft guide 42 opposite the rack shaft sliding contact surface 42a.

A seal groove 42c is formed on the circumference of the rack shaft guide 42. A seal ring such as an O-ring, not illustrated, is fitted in the seal groove 42c, and sealability between the outer circumference of the rack shaft guide 42 and the inner wall of the steering gearbox 6 is maintained.

A spring-receiving plug 43 is screwed into the steering gearbox 6. A base end of the spring-receiving plug 43 protrudes from the steering gearbox 6, and a lock nut 45 engages therewith. The lock nut 45 is fastened, and the spring-receiving plug 43 is consequently secured to the steering gearbox 6.

In the rack shaft guide 42, the spring-containing recessed portion 42b is closed near a base. An adjusting spring 44 that serves as an urging member is contained in the spring-containing recessed portion 42b.

A base end of the adjusting spring 44 is in contact with a seat surface of the spring-receiving plug 43.

Consequently, the rack shaft sliding contact surface 42a of the rack shaft guide 42 presses and urges the rack shaft 7 against the pinion of the pinion shaft 5 by using the urging force of the adjusting spring 44.

Figure 3:
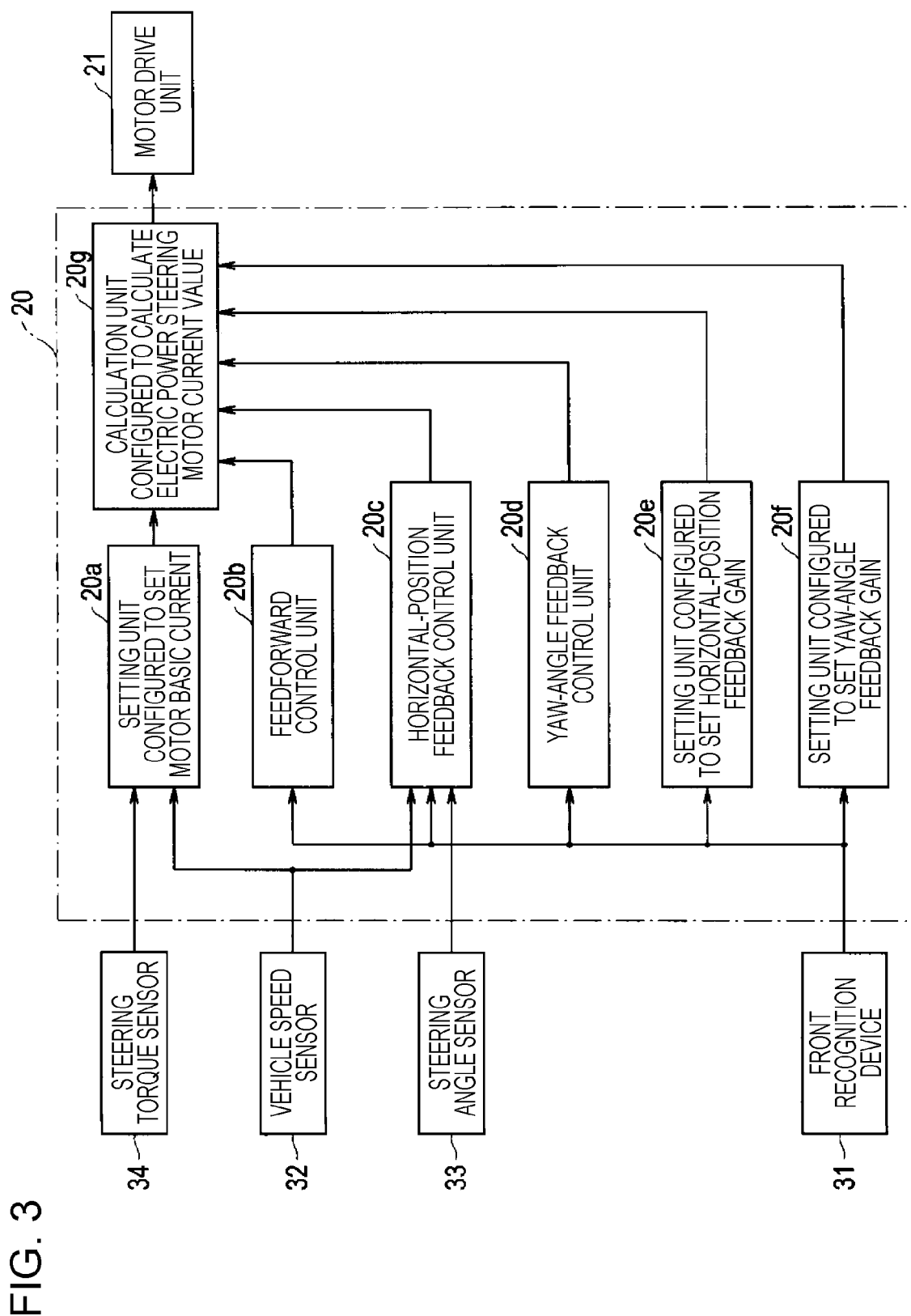
FIG. 3 is a functional block diagram of a steering control unit.

As illustrated in FIG. 3, a steering control unit 20 includes a setting unit 20a configured to set a motor basic current (referred to below as a setting unit 20a), a feedforward control unit 20b, a horizontal-position feedback control unit 20c, a yaw-angle feedback control unit 20d, a setting unit 20e configured to set a horizontal-position feedback gain (referred to below as a setting unit 20e), a setting unit 20f configured to set a yaw-angle feedback gain (referred to below as a setting unit 20f), and a calculation unit 20g configured to calculate an electric power steering motor current value (referred to below as a calculation unit 20g).

An electric power steering motor (an electric motor) 12 is coupled to the pinion shaft 5 with an assistance transmission mechanism 11 interposed therebetween. The electric motor 12 assists in applying steering torque to the steering wheel 4 and applies steering torque such that a set steering angle (a target steering angle) is obtained. A target current that has a control output value is outputted from the steering control unit 20 described later to a motor drive unit 21, and the electric motor 12 is driven by the motor drive unit 21.

A front recognition device 31 is coupled to the steering control unit 20, recognizes left and right lane lines in front thereof as the shape of the travel path and recognizes the shape of the travel path for obtaining information about the positions of the lane lines. A vehicle speed sensor 32 that detects the vehicle speed, the steering angle sensor 33 that detects the steering angle (the actual steering angle), a steering torque sensor 34 that detects the steering torque are coupled to the steering control unit 20.

The front recognition device 31 is mounted, for example, on the front of a ceiling of a vehicle cabin, is a predetermined gap spaced therefrom, and includes a set of CCD cameras for imaging stereo images of an object outside the vehicle from different locations and a stereo-image-processing device that processes image date from the CCD cameras.

The stereo-image-processing device of the front recognition device 31 processes the image date from the CCD cameras, for example, in the following manner. Distance information is obtained from the amounts of positional deviation between a pair of stereo images that is imaged by the CCD cameras in the direction in which the vehicle travels, and a distance image is generated.

For recognition of lane line data, change in luminance in the direction of the width of the road is evaluated based on the knowledge that the luminance of the lane lines is higher than that of a road surface, and the positions of the left and right lane lines on an image plane are identified on the image plane. The position (x, y, z) of each lane line in the real space is calculated as a known expression for coordinate conversion, based on a position (i, j) on the image plane and a parallax that is calculated regarding the position, that is, based on the distance information.

In a coordinate system in the real space that is set based on the position of the vehicle according to the embodiment, for example, the origin is the road surface right below the middle between the stereo cameras, the direction of the width of the vehicle is an x-axis, the direction of the height of the vehicle is a y-axis, and the direction of the length of the vehicle (a distance direction) is a z-axis (see FIG. 5).

In the case where the road is flat, an x-z plane (y=0) coincides with the road surface. A road model is expressed by separating a travel lane for the vehicle on the road into compartments in the distance direction and by approximating and coupling the left and right lane lines in the compartments in a predetermined manner.

The steering control unit 20 sets an electric motor basic current value Ipsb depending on steering torque Td of the driver, based on input signals described above, calculates a feedforward control amount Iff of the electric motor 12 for traveling on a target path (according to the embodiment, the middle between the left lane line and the right lane line) under feedforward control based on the shape of the travel path, and calculates the amount Δx of positional deviation between the target path and a presumed vehicle trajectory at a front gaze point that is set in advance by presuming the trajectory of the vehicle.

The steering control unit 20 implements control such that the amount Δx of deviation is eliminated, calculates a horizontal-position feedback control amount Ifb for travelling on the target path, and calculates a yaw-angle feedback control amount Ifby for adjusting the yaw angle of the vehicle such that the vehicle is kept on the target path.

Regarding each control amount of the feedback control, if the value of the width Wr of the travel path is large, the steering control unit 20 sets the horizontal-position feedback gain of the horizontal-position feedback control amount Ifb to a gain larger than that in the case where the value of the width Wr of the travel path is small. If the value of the width Wr of the travel path is small, the steering control unit 20 sets the yaw-angle feedback gain of the yaw-angle feedback control amount Ifby to a gain larger than that in the case where the value of the width Wr of the travel path is large.

The steering control unit 20 adds the values described above and calculates an electric motor current value Icmd, outputs the electric motor current value Icmd to the motor drive unit 21, and controls the drive of the electric motor 12.

The setting unit 20a receives a vehicle speed V from the vehicle speed sensor 32 and receives the steering torque Td from the steering torque sensor 34.

Figure 4:
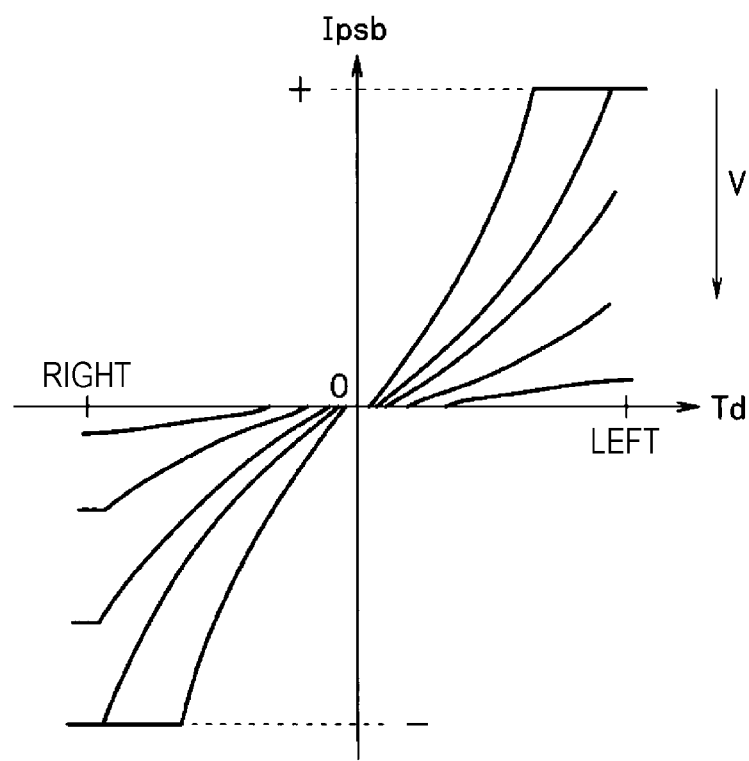
FIG. 4 illustrates the characteristics of the steering torque and electric motor basic current value of an electric power steering motor by way of example.

The electric motor basic current value Ipsb is set, for example, by referring to a characteristic map of the steering torque Td and the electric motor basic current value Ipsb that is set in advance as illustrated in FIG. 4 and is outputted to the calculation unit 20g.

The feedforward control unit 20b receives image information that is recognized from the front recognition device 31. The feedforward control amount (current value) Iff of the electric motor 12 for travelling on the target path is calculated as, for example, an expression (1) described below and is outputted to the calculation unit 20g.

$$Iff = Giff \cdot \kappa \qquad (1)$$

Here, κ is a lane curvature expressed as, for example, the following expression (2):

$$\kappa = (\kappa 1 + \kappa r)/2. \qquad (2)$$

In the expression (2), κ1 is a curvature component of the left lane line, and κr is a curvature component of the right lane line.

Figure 5:
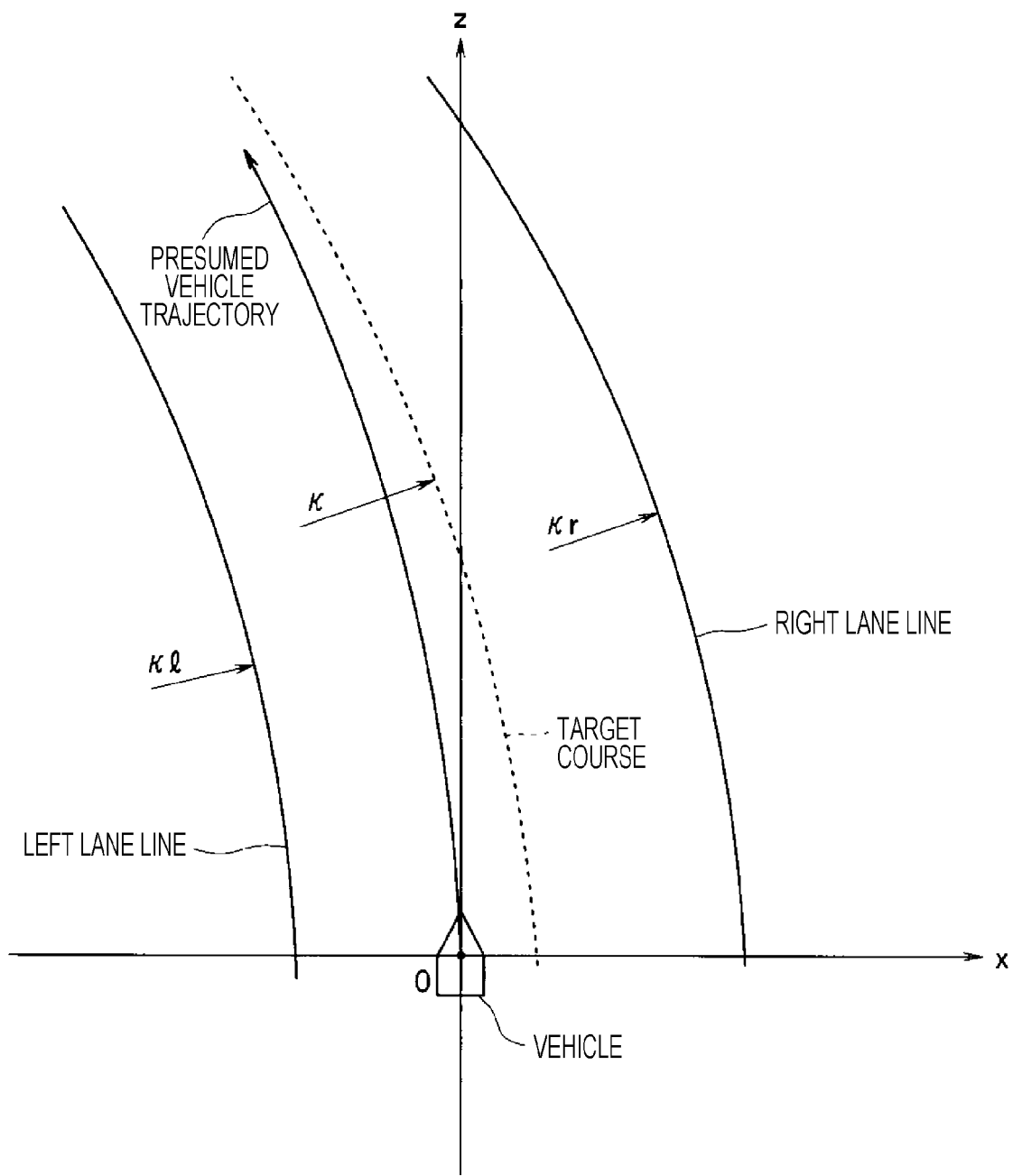
FIG. 5 illustrates feedforward control.

In one example, the curvature components κ1 and κr of the left and right lane lines are determined by using the coefficient of a quadratic term that is calculated by using a quadratic function of the least-squares method regarding the left and right lane lines illustrated in FIG. 5.

For example, in the case where the lane lines are approximated by using a quadratic expression of $x = A \cdot z^2 + B \cdot z + C$, the value of 2·A is used as the curvature component. The curvature components κ1 and κr of the lane lines may be the curvature of the lane lines as it is.

In the expression (1), Giff represents a feedforward gain that is set in advance through an experiment or calculation. The feedforward control unit 20b is thus provided as a controller for controlling feedforward.

The horizontal-position feedback control unit 20c receives the image information that is recognized from the front recognition device 31, receives the vehicle speed V from the vehicle speed sensor 32, and receives a steering angle θp from the steering angle sensor 33.

The horizontal-position feedback control amount (current value) Ifb is calculated as an expression (3) described below, and the horizontal-position feedback control amount Ifb is outputted to the calculation unit 20g.

$$Ifb = Gifb \cdot \Delta x \qquad (3)$$

Figure 6:
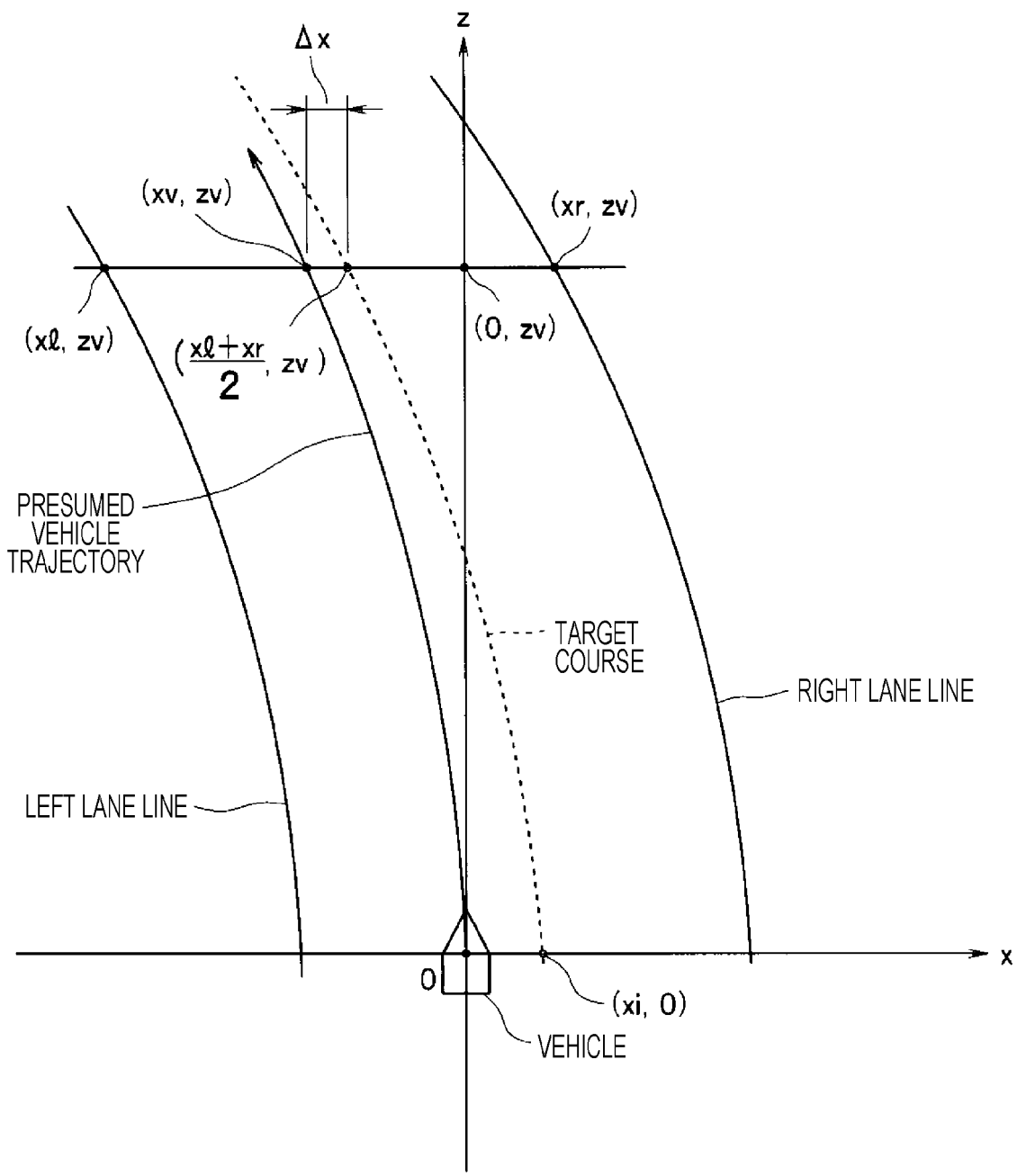
FIG. 6 illustrates horizontal-position feedback control.

Here, Gifb is a gain that is set in advance through an experiment or calculation. As illustrated in FIG. 6, Δx is calculated as an expression (4) described below.

$$\Delta x = (x1 + xr)/2 - xv \qquad (4)$$

In the expression (4), xv is the x-coordinate of the presumed vehicle trajectory at the z-coordinate of a front gaze point (0, zv) of the vehicle, and zv is the front gaze distance (the z-coordinate) of the front gaze point (0, zv) and is calculated as zv=T·V according to the embodiment. Here, T is a foresight time that is set in advance and is set to, for example, 1.2 sec.

Accordingly, in the case where the specifications or inherent stability factors As of the vehicle are used based on a travelling state of the vehicle, xv can be calculated as, for example, the following expression (5):

$$xv = (\tfrac{1}{2}) \cdot (1/(1+As \cdot V^2)) \cdot (\theta p/Lw) \cdot (T \cdot V)^2. \qquad (5)$$

Here, Lw is a wheelbase. In the expression (4), x1 is the x-coordinate of the left lane line at the z-coordinate of the front gaze point (0, zv), and κr is the x-coordinate of the right lane line at the z-coordinate of front gaze point (0, zv).

xv described above can be calculated as an expression (6) described below by using the vehicle speed V and a yaw rate (dθ/dt) or can be calculated as an expression (7) described below based on the image information.

$$xv = (\tfrac{1}{2}) \cdot ((d\theta/dt)/V) \cdot (V \cdot T)^2 \qquad (6)$$

$$xv = (\tfrac{1}{2}) \cdot \kappa (V \cdot T)^2 \qquad (7)$$

The horizontal-position feedback control unit 20c is thus provided as a controller for controlling horizontal-position feedback. The yaw-angle feedback control unit 20d receives the image information that is recognized from the front recognition device 31.

The yaw-angle feedback control amount (current value) Ifby for feedback control of the yaw angle of the vehicle such that the vehicle is kept on the target path is calculated as, for example, an expression (8) described below and is outputted to the calculation unit 20g.

$$Ifby = Gifby \cdot (\theta t1 + \theta tr)/2 \qquad (8)$$

Figure 7:
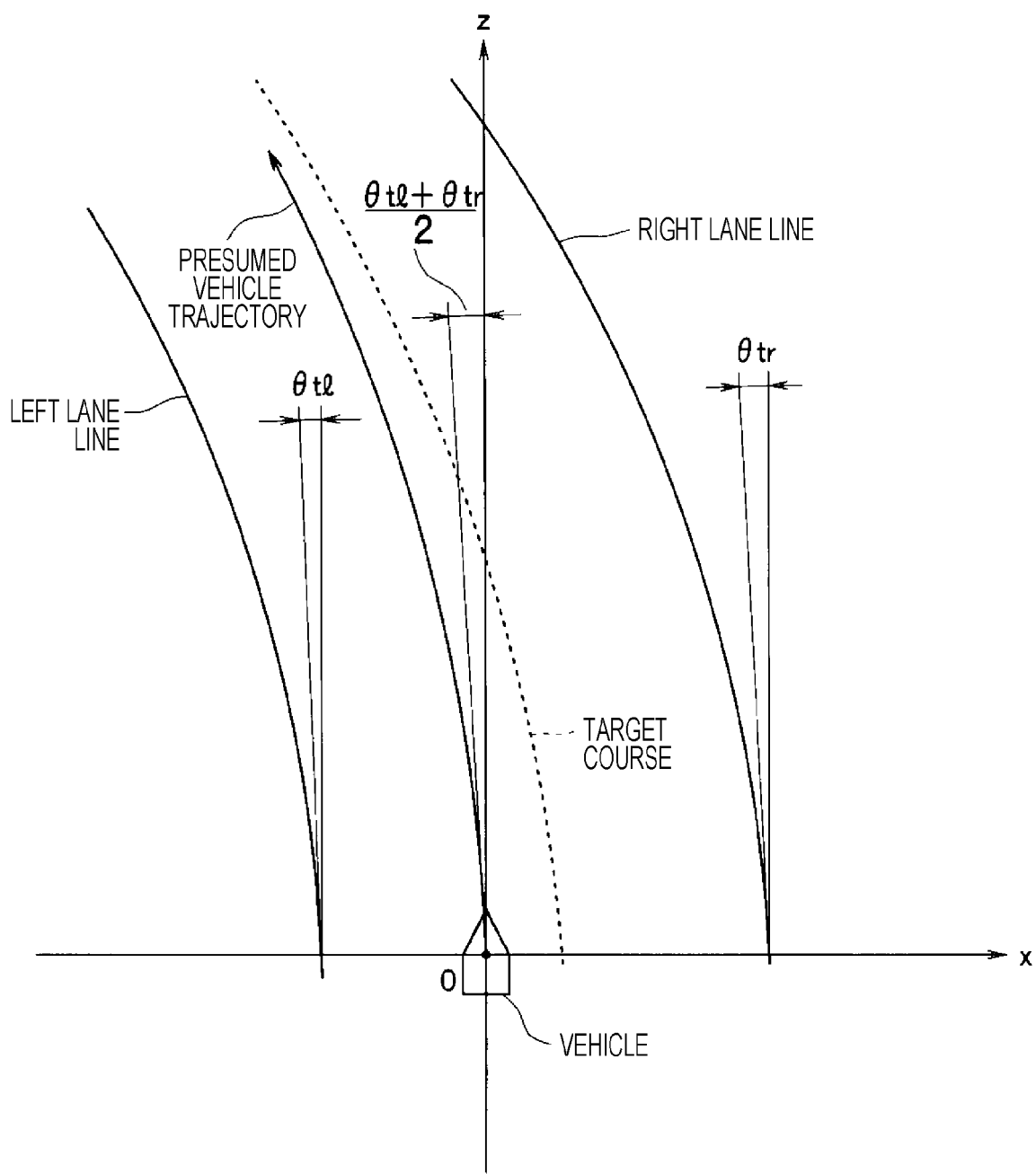
FIG. 7 illustrates yaw-angle feedback control.

Here, Gifby is a gain that is set in advance through an experiment or calculation, θt1 is the tilt of the vehicle with respect to the left lane line in the image information from the front recognition device 31, and θtr is the tilt of the vehicle with respect to the right lane line in the image information from the front recognition device 31 (see FIG. 7).

For example, the coefficient (that is, the value of B when the lane lines are approximated as $x = A \cdot z^2 + B \cdot z + C$) of a primary term that is calculated by using a quadratic function of the least-squares method regarding the points of the lane lines that are obtained in the image information may be used for θ and θtr. The yaw-angle feedback control unit 20d is thus provided as a controller for controlling yaw-angle feedback.

The setting unit 20e receives the image information that is recognized from the front recognition device 31. The width Wr of the travel path is obtained based on the image information, for example, from the distance between the left lane line and the right lane line, and the width Wr of the travel path is compared with a reference width C that is set in advance.

If the result of the comparison is that the width Wr of the travel path is more than the reference width C (Wr>C), and the width Wr of the travel path can be determined to be a wide travel path such as a highway, a horizontal-position feedback gain Gfb1 that has a large value is set as a horizontal-position feedback gain Gfb by which the horizontal-position feedback control amount Ifb is multiplied.

However, if the width Wr of the travel path is equal to or less than the reference width C (Wr≤C), and the width Wr of the travel path can be determined to be a narrow travel path such as a general road, a horizontal-position feedback gain Gfb2 that has a small value is set as the horizontal-position feedback gain Gfb by which the horizontal-position feedback control amount Ifb is multiplied.

That is, if Gfb1>Gfb2 is satisfied, and the width Wr of the travel path is wide, the degree of influence of the horizontal-position feedback control amount Ifb is set to be higher than that in the case where the width Wr of the travel path is narrow, and the horizontal-position feedback gain Gfb thus set is outputted to the calculation unit 20g. The setting unit 20e is thus provided as a unit for setting the horizontal-position feedback gain.

The setting unit 20f receives the image information that is recognized from the front recognition device 31. The width Wr of the travel path is obtained based on the image information, for example, from the distance between the left lane line and the right lane line, and the width Wr of the travel path is compared with the reference width C that is set in advance.

If the result of the comparison is that the width Wr of the travel path is more than the reference width C (Wr>C), and the width Wr of the travel path can be determined to be a wide travel path such as a highway, a yaw-angle feedback gain Gfby1 that has a small value is set as a yaw-angle feedback gain Gfby by which the yaw-angle feedback control amount Ifby is multiplied.

However, if the width Wr of the travel path is equal to or less than the reference width C (Wr≤C), and the width Wr of the travel path can be determined to be a narrow travel path such as a general road, a yaw-angle feedback gain Gfby2 that has a large value is set as the yaw-angle feedback gain Gfby by which the yaw-angle feedback control amount Ifby is multiplied.

That is, if Gfby1<Gfby2 is satisfied, and the width Wr of the travel path is narrow, the degree of influence of the yaw-angle feedback control amount Ifby is set to be higher than that in the case where the width Wr of the travel path is wide, and the yaw-angle feedback gain Gfby thus set is outputted to the calculation unit 20g. The setting unit 20f is thus provided as a unit for setting the yaw-angle feedback gain.

The calculation unit 20g receives the electric motor basic current value Ipsb from the setting unit 20a, the feedforward control amount Iff from the feedforward control unit 20b, the horizontal-position feedback control amount Ifb from the horizontal-position feedback control unit 20c, the yaw-angle feedback control amount Ifby from the yaw-angle feedback control unit 20d, the horizontal-position feedback gain Gfb from the setting unit 20e, and the yaw-angle feedback gain Gfby from the setting unit 20f.

The electric motor current value Icmd is calculated as, for example, an expression (9) described below and is outputted to the motor drive unit 21, and the drive of the electric motor 12 is controlled.

$$\text{Icmd} = \text{Ipsb} + \text{Iff} + \text{Gfb} \cdot \text{Ifb} + \text{Gfby} \cdot \text{Ifby} \quad (9)$$

The steering control unit 20 thus configured implements the lane keeping control. An example of the lane keeping control of the steering control unit 20 is known, and a detailed description of the example of the control is omitted.

As for the rack shaft support mechanism 40 that is disposed on the steering gearbox 6, wobbling of the rack gear of the rack shaft 7 and the pinion gear of the pinion shaft 5 is reduced.

Figure 8:
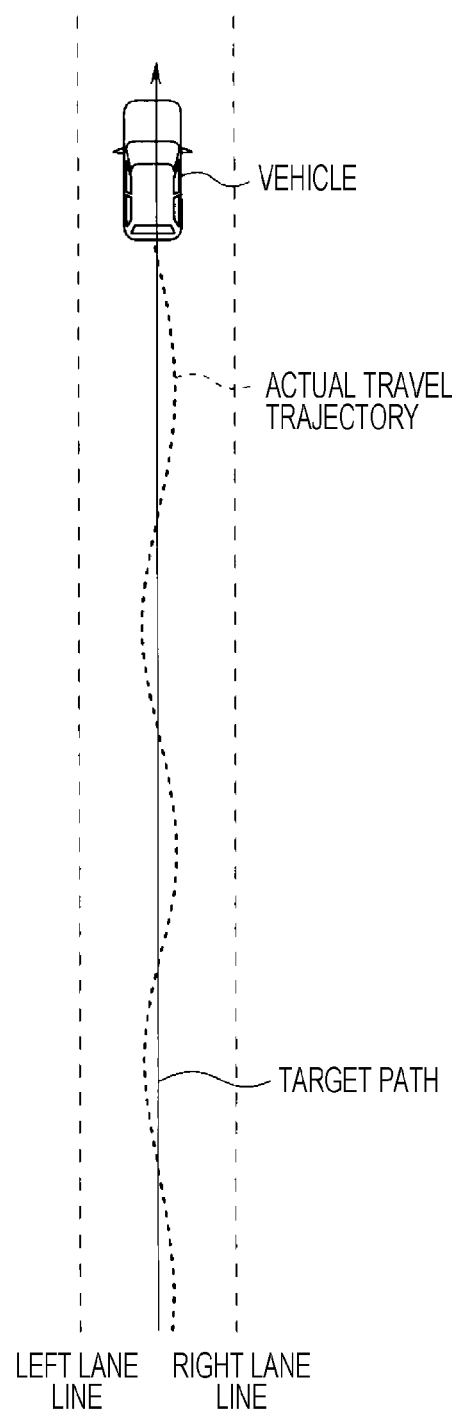
FIG. 8 illustrates an actual travel trajectory relative to a target path for a vehicle on a straight road with time.

As for the rack gear and the pinion gear, friction is generated between sliding contact portions with time, the responsiveness of a steering angle rate with respect to the steering angle (the target steering angle) improves due to a decrease in the friction, and an error of the response speed of the actual steering angle of the vehicle occurs. In one example, the rate of the actual steering angle during the lane keeping is higher than that of the target steering angle. As illustrated in FIG. 8, the vehicle moves fast toward the target path at the middle between the left lane line and the right lane line, and the vehicle meanders because of control such that the vehicle is forced to return.

Figure 9:
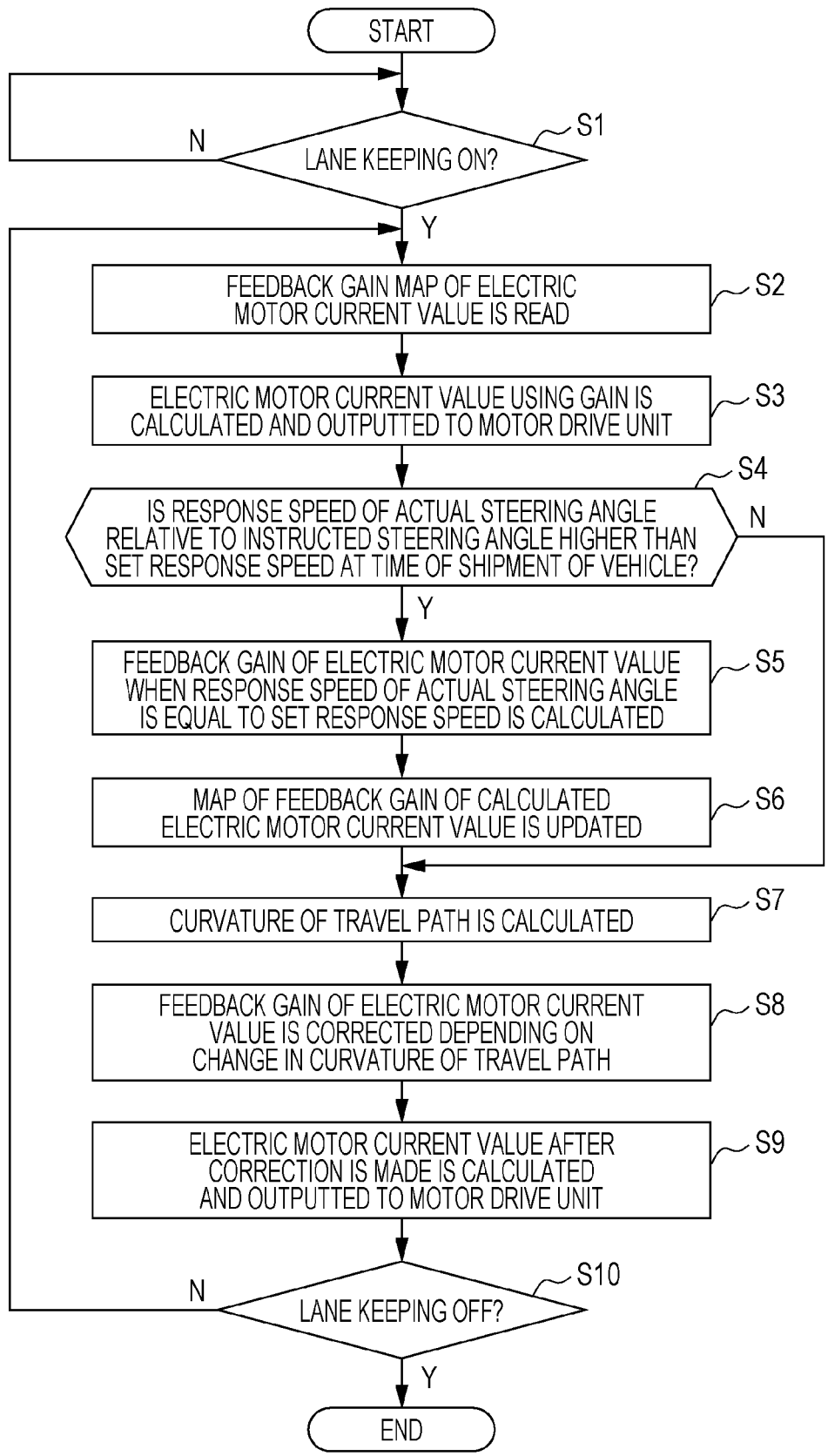
FIG. 9 is a flowchart illustrating an example of control during lane keeping.

To improve such a phenomenon, the electric power steering device 1 according to the embodiment implements, for example, control illustrated in a flowchart in FIG. 9 during the lane keeping control.

As illustrated in the flowchart in FIG. 9, the steering control unit 20 of the electric power steering device 1 first determines whether the lane keeping is ON (S1).

If the lane keeping is ON, a feedback gain map of an electric motor current value Icmdn that is stored in an internal memory is read (S2). A feedback gain IGkn described herein is a gain amount for calculating an electric motor current value Ik that is improved such that a response speed Vn that is the steering angle rate of the actual steering angle of the vehicle relative to the instructed steering angle (the target steering angle) is equal to a set response speed V0 at the time of shipment of the vehicle. For this reason, in the written map, the feedback gain IGkn for calculating the electric motor current value Ik is zero (IGkn=0) at the time of shipment of the vehicle.

The steering control unit 20 calculates an electric motor current value Icmdn+1 using the feedback gain IGkn that is read at the step S2 and outputs the electric motor current value Icmdn+1 to the motor drive unit 21 (S3).

The electric motor current value Icmdn that is calculated as the expression (9) described above is multiplied by the read feedback gain IGkn, and the electric motor current value Icmdn+1 is determined.

The steering control unit 20 compares the response speed Vn of the actual steering angle that is detected by the steering angle sensor 33 relative to the instructed steering angle (the target steering angle) and the set response speed V0 at the time of shipment of the vehicle and determines whether the response speed Vn is higher than the set response speed V0 (S4).

At the step S4, if the response speed Vn of the actual steering angle relative to the instructed steering angle (the target steering angle) is equal to the set response speed V0 at the time of shipment of the vehicle (Vn=V0), the process of the steering control unit 20 proceeds to a step S7.

If the response speed Vn of the actual steering angle relative to the instructed steering angle (the target steering angle) is higher than the set response speed V0 at the time of shipment of the vehicle (Vn>V0), the process of the steering control unit 20 proceeds to a step S5. At the step S5, the steering control unit 20 calculates a feedback gain IGkn+1 of the electric motor current value Icmdn+1 for adjusting the response speed Vn of the actual steering angle to a speed equal to the set response speed V0 at the time of shipment of the vehicle (Vn=V0) (S5).

The steering control unit 20 rewrites the map of the feedback gain IGkn+1 of the calculated electric motor current value Icmdn+1 in the internal memory for update (S6).

Subsequently, the steering control unit 20 calculates the curvature of the travel path, based on the received image information of the front recognition device 31 (S7) and corrects the feedback gain IGkn+1 of the electric motor current value Icmdn+1 depending on a change in the calculated curvature of the travel path (S8).

The steering control unit 20 calculates the electric motor current value Icmdn+1 using the corrected feedback gain IGkn+1 and outputs the electric motor current value Icmdn+1 to the motor drive unit 21 (S9).

Figure 10:
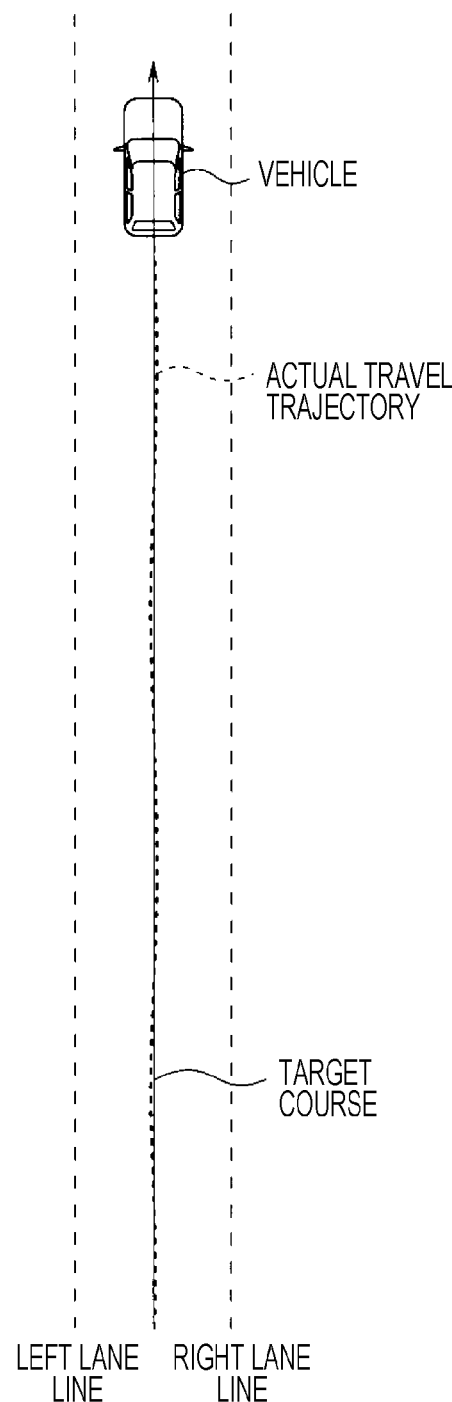
FIG. 10 illustrates the actual travel trajectory relative to the target path for the vehicle on the straight road during control.

The amount of correction of the feedback gain IGkn+1 is changed depending on the change in the curvature of the travel path on which the vehicle is to travel. That is, in the case where the travel path is, for example, a straight line as illustrated in FIG. 10 when the steering control unit 20 implements control at the steps S7 to S9, the change in the curvature of the travel path is substantially 0 (zero). Accordingly, the amount of correction of the feedback gain IGkn+1 is not changed, and this inhibits the vehicle from meandering unlike that illustrated in FIG. 8, and the vehicle can stably travel on the target travel path at the middle between the left lane line and the right lane line, that is, a go-straight travelling ability is obtained.

For example, in the case where the travel path is a steady turning path, the change in the curvature of the travel path is substantially 0 (zero), and the steering control unit 20 does not change the amount of correction of the feedback gain IGkn+1 or slightly decreases the amount of correction. Consequently, the vehicle can stably travel on the target travel path at the middle between the left lane line and the right lane line, that is, a turning travelling ability is obtained.

Figure 11:
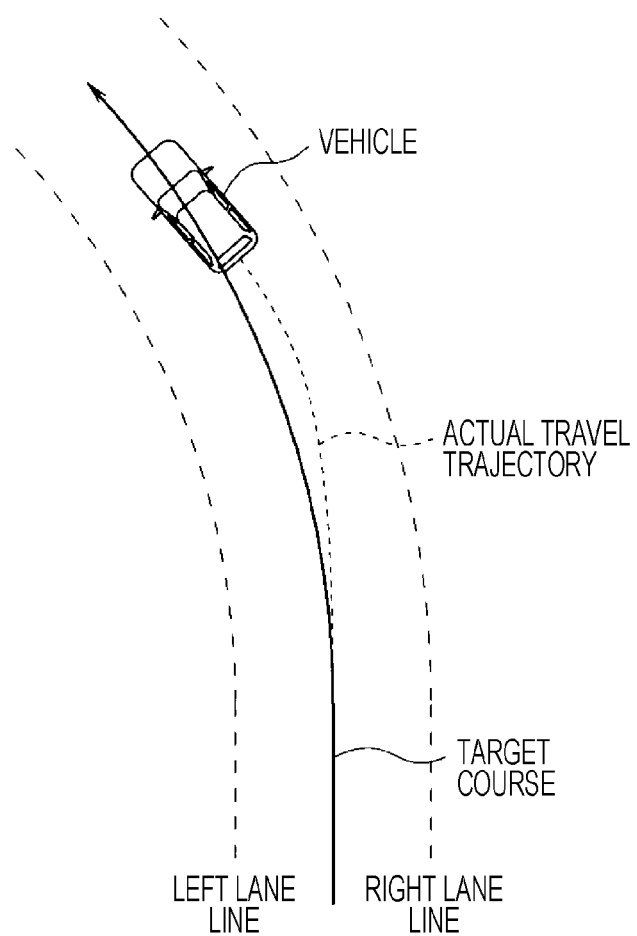
FIG. 11 illustrates the actual travel trajectory relative to the target path for the vehicle when the vehicle enters a curve in the case where a feedback gain is not corrected.
Figure 12:
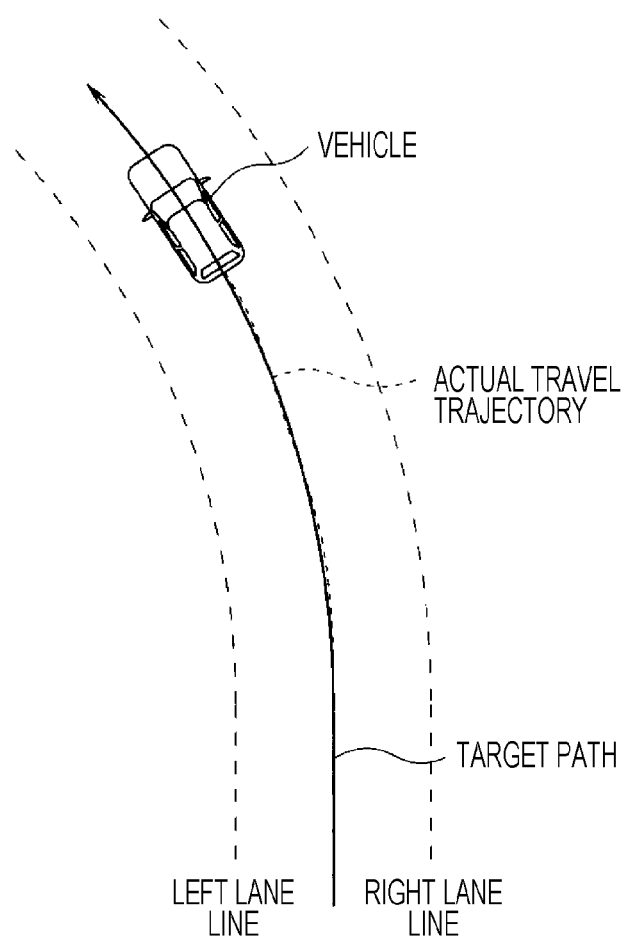
FIG. 12 illustrates the actual travel trajectory relative to the target path for the vehicle when the vehicle enters the curve in the case where the feedback gain is corrected.

For example, in the case where the curvature of the travel path greatly changes, for example, when the vehicle enters a curve, the change in the curvature of the travel path increases, and the steering control unit 20 decreases the amount of correction of the feedback gain IGkn+1 depending on the change. Consequently, the response speed Vn of the actual steering angle relative to the instructed steering angle (the target steering angle) increases, this prevents the vehicle from shifting toward the outside of the curve due to delay of a steering response and prevents the vehicle from deviating from the target path at the middle between the left lane line and the right lane line as illustrated in FIG. 11, and the vehicle can stably travel on the target path when entering the curve as illustrated in FIG. 12, that is, a curve travelling ability is obtained.

The steering control unit 20 determines whether the lane keeping is OFF (S10). If the lane keeping is not OFF, the process of the steering control unit 20 returns to the step S2, and the step S2 to the step S9 are repeated. If the lane keeping is OFF, the control ends.

During the lane keeping such that the vehicle is kept on the target path by automatic steering or assisted steering, the steering control unit 20 according to the embodiment determines whether the behavior of the vehicle changes relative to the steering responsiveness at the time of shipment of the vehicle due to a mechanical factor such as the rack and pinion gear that wears with time, determines how fast the vehicle responds, and implements control to maintain the steering responsiveness at the time of shipment of the vehicle by changing the feedback gain of the electric motor current value depending on the determinations as described above. That is, the steering control unit 20 implements the control such that the deviation of the actual steering angle of the vehicle from the target steering angle during the lane keeping is corrected, and the steering responsiveness returns to the steering responsiveness at the time of shipment of the vehicle.

Moreover, the steering control unit 20 corrects the feedback gain of the electric motor current value depending on changes in curvature of travel paths that have different degrees of curvature, for example, when the vehicle travels straight, turns, or enters a curve and controls the vehicle such that the vehicle stably travels on the target path at the middle between the left lane line and the right lane line.

Consequently, the stability of the vehicle that travels straight, in particular, is maintained, feeling does not change over time, and the driver does not feel strange.

The lane keeping control apparatus for the vehicle according to the embodiment can inhibit the hunting (the oscillation of the vehicle trajectory) from occurring due to the deviation of the actual steering angle from the instructed steering angle under the lane keeping control when the response of the steering becomes sensitive with time as described above. Consequently, the vehicle can stably travel as in the time of shipment.

In an example described according to the above embodiment, the shape of the travel path is recognized based on the images from the set of the CCD cameras but may be recognized based on image information from a monocular camera or a color camera. The steering control may be implemented by using the value of the position of the vehicle that is detected by a GPS that is installed in the vehicle.

The steering control unit 20 of the electric power steering device 1 includes a processor that includes a central processing unit (CPU) and storage devices such as a ROM and a RAM. All or some of circuits of the processor may be configured by performing software. For example, various programs for functions that are stored in the ROM may be read and run by the CPU.

All or some of functions of the processor may be performed by a logic circuit or an analog circuit. Various programs may be performed by an electronic circuit such as a field programmable gate array (FPGA).

The embodiment of the disclosure described above is not restrictive, and other various modifications can be made without departing from the spirit thereof when the embodiment is carried out. The embodiment described above includes inventive features at various stages, and various inventive features can be extracted from appropriate combinations of disclosed elements.

For example, when the problem described above can be solved, and the effects described above can be achieved even after some elements are removed from all of the elements disclosed according to the embodiment, elements other than the removed elements can be extracted as inventive features.

The invention claimed is:

1. A lane keeping control apparatus for a vehicle, the lane keeping control apparatus comprising a controller configured to execute a lane keep control processing, the lane keep control processing including
setting a target path on which the vehicle is to travel,
calculating a control amount for an electric power steering motor, on a basis of at least an amount of deviation from the target path and a feedback gain stored in a memory, for controlling the vehicle traveling on the target path, and
determining a first current value of the electric power steering motor for controlling the vehicle traveling on the target path, wherein the first current value causes a steering angle of the vehicle to be a target steering angle for travelling on the target path with a set response speed equal to a response speed at a time of shipment, wherein
the electric power steering motor is configured to apply a torque to an electronic power steering device, the electronic power steering device comprises a pinion shaft comprising a pinion gear and a rack shaft comprising a rack gear, the pinion gear and the rack gear are disposed in sliding contact with each other at sliding contact portions,
the controller is configured to execute, based on determining that the lane keep control processing is executed, a processing repeatedly, the processing including:
reading the feedback gain from the memory;
driving the electric power steering motor with a second current value determined based on multiplying the calculated control amount by the read feedback gain to cause the steering angle of the vehicle to be the target steering angle for travelling on the target path with a response speed so that the amount of deviation from the target path of the vehicle that meanders across the target travel path is smaller when driving the electric power steering motor with the second current value than when driving the electric power steering motor with the calculated control amount;
comparing the response speed with the set response speed which is equal to the response speed at the time of shipment;
in response to the response speed being greater than the set response speed,
determining a corrected feedback gain for driving the electric power steering motor such that the response speed is equal to the set response speed, and
correcting the read feedback gain with the determined corrected feedback gain such that the response speed is equal to the set response speed, resulting in the response speed being equal to the response speed at the time of shipment;
calculating a curvature of a travel path for the vehicle based on image information on a front of the vehicle received from a recognition device including a camera of the vehicle;
correcting the corrected feedback gain in accordance with a change in the curvature of the travel path for the vehicle; and
updating the feedback gain stored in the memory with the corrected feedback gain.

2. The lane keeping control apparatus according to claim 1, wherein an amount of correction of the gain decreases as the change in curvature increases.

3. A lane keeping control apparatus for a vehicle, the lane keeping control apparatus comprising circuitry configured to execute a lane keep control processing, the lane keep control processing including
setting a target path on which the vehicle is to travel,
calculating a control amount for an electric power steering motor, on a basis of at least an amount of deviation from the target path and a feedback gain stored in a memory, for controlling the vehicle traveling on the target path, and
determining a first current value of the electric power steering motor for controlling the vehicle traveling on the target path, wherein the first current value causes a steering angle of the vehicle to be a target steering angle for travelling on the target path with a set response speed equal to a response speed at a time of shipment, wherein
the electric power steering motor is configured to apply a torque to an electronic power steering device, the electronic power steering device comprises a pinion shaft comprising a pinion gear and a rack shaft comprising a rack gear, the pinion gear and the rack gear are disposed in sliding contact with each other at sliding contact portions,
the circuitry is configured to execute, based on determining that the lane keep control processing is executed, a processing repeatedly, the processing including:
reading the feedback gain stored in the memory;
driving the electric power steering motor with a second current value determined based on multiplying the calculated control amount by the read feedback gain to cause the steering angle of the vehicle to be the target steering angle for travelling on the target path with a response speed so that the amount of deviation from the target path of the vehicle that meanders across the target travel path is smaller when driving the electric power steering motor with the second current value than when driving the electric power steering motor with the calculated control amount;
comparing a response speed with the set response speed which is equal to the response speed at the time of shipment;
in response to the response speed being greater than the set response speed, determining a corrected feedback gain for driving the electric power steering motor such that the response speed is equal to the set response speed, resulting in the response speed being equal to the response speed at the time of shipment;
calculating a curvature of a travel path for the vehicle based on image information on a front of the vehicle received from a recognition device including a camera of the vehicle;
correcting the corrected feedback gain in accordance with a change in the curvature of the travel path for the vehicle;
updating the feedback gain stored in the memory with the corrected feedback gain.

* * * * *